United States Patent
Thornton et al.

(10) Patent No.: US 11,685,505 B2
(45) Date of Patent: *Jun. 27, 2023

(54) WINDOW FOR AN AIRCRAFT AND DISPLAY FOR AIRCRAFT WINDOW

(71) Applicant: Gulfstream Aerospace Corporation, Savannah, GA (US)

(72) Inventors: Sean Thornton, Savannah, GA (US); John Bullock, Savannah, GA (US); Timothy O'Hara, Savannah, GA (US); Matthew Wallace, Savannah, GA (US); Bryan Briscoe, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/664,793

(22) Filed: May 24, 2022

(65) Prior Publication Data

US 2022/0281581 A1 Sep. 8, 2022

Related U.S. Application Data

(63) Continuation of application No. 16/821,666, filed on Mar. 17, 2020, now Pat. No. 11,390,370, which is a
(Continued)

(51) Int. Cl.
*G06F 3/048* (2013.01)
*B64C 1/14* (2006.01)
(Continued)

(52) U.S. Cl.
CPC ........ *B64C 1/1484* (2013.01); *B64D 11/0015* (2013.01); *B64D 45/00* (2013.01); *G02B 27/01* (2013.01); *G02B 2027/0196* (2013.01)

(58) Field of Classification Search
None
See application file for complete search history.

(56) References Cited

U.S. PATENT DOCUMENTS 4,679,610 A * 7/1987 Spraggins ................. E06B 9/24
160/84.02
4,890,878 A * 1/1990 Harary ................... B60N 2/783
296/153
(Continued)

FOREIGN PATENT DOCUMENTS

CN 101389533 A 3/2009
CN 202011398 U 10/2011
(Continued)

*Primary Examiner* — William C Trapanese
(74) *Attorney, Agent, or Firm* — LKGlobal | Lorenz & Kopf, LLP

(57) ABSTRACT

A sidewall assembly for an aircraft and an aircraft are provided. In one example, the sidewall assembly includes a window. A sidewall portion has an inner-facing side and at least partially surrounds the window. The sidewall portion and the window have a curved contour. A transparent display panel is coupled to the sidewall portion and covers the inner-facing side of the sidewall portion including the window. The transparent display panel includes a display screen configured to display information to a passenger. The transparent display panel including the display screen have a curved contour that substantially matches the curved contour of the sidewall portion and the window. A display controller is in communication with the transparent display panel to communicate a video/audio signal providing the information to the display screen.

18 Claims, 7 Drawing Sheets

Related U.S. Application Data continuation-in-part of application No. 16/421,891, filed on May 24, 2019, now Pat. No. 10,996,810.

(51) Int. Cl.
*B64D 11/00* (2006.01)
*B64D 45/00* (2006.01)
*G02B 27/01* (2006.01)

(56) References Cited

U.S. PATENT DOCUMENTS

| | | | |
|---|---|---|---|
| 5,903,247 A | 5/1999 | Howard et al. | |
| 2008/0021636 A1* | 1/2008 | Stavaeus | G08G 5/0021 |
| | | | 701/408 |
| 2008/0042012 A1* | 2/2008 | Callahan | B64C 1/1492 |
| | | | 359/275 |
| 2010/0014009 A1* | 1/2010 | Stavaeus | B64D 11/0015 |
| | | | 348/837 |
| 2013/0161971 A1 | 6/2013 | Ash et al. | |
| 2014/0300830 A1 | 10/2014 | Wang | |
| 2015/0077337 A1 | 3/2015 | Coto-Lopez et al. | |
| 2018/0081615 A1* | 3/2018 | Riedel | G06F 3/1423 |

FOREIGN PATENT DOCUMENTS

| | | |
|---|---|---|
| CN | 107100504 A | 8/2017 |
| CN | 108639352 A | 10/2018 |
| DE | 102006007283 A1 | 8/2007 |
| EP | 3090947 A1 | 11/2016 |
| EP | 3470327 A1 | 4/2019 |
| EP | 3666649 A1 | 6/2020 |
| WO | 2018119436 A1 | 6/2018 |

\* cited by examiner

WINDOW FOR AN AIRCRAFT AND DISPLAY FOR AIRCRAFT WINDOW

CROSS-REFERENCE TO RELATED APPLICATIONS

This application is a continuation application of U.S. application Ser. No. 16/821,666 that was filed on Mar. 17, 2020, which is a continuation-in-part (CIP) application of U.S. application Ser. No. 16/421,891 that was filed on May 24, 2019, the entire contents of which are incorporated herein by reference.

TECHNICAL FIELD

The present disclosure relates to a sidewall including a window for an aircraft, and more particularly to a sidewall construction including a window for an aircraft having an integrated display unit.

BACKGROUND

This section provides background information related to the present disclosure which is not necessarily prior art.

The desire for improved entertainment for passengers on aircraft has led to an increase in the number of screens for passengers to provide on-demand content. The proliferation of these screens has increased the weight of the aircraft thereby hurting aircraft fuel economy. It is therefore desirable to provide a mechanism which decreases this increased weight without decreasing passenger access to on-demand content.

SUMMARY

Various non-limiting embodiments of a sidewall assembly for an aircraft, and various non-limiting embodiments of an aircraft, are provided herein.

In a first non-limiting embodiment, the sidewall assembly includes, but is not limited to, a window. The sidewall assembly further includes, but is not limited to, a sidewall portion that has an inner-facing side and that at least partially surrounds the window. The sidewall portion and the window have a curved contour. The sidewall assembly further includes, but is not limited to, a transparent display panel that is coupled to the sidewall portion and that covers the inner-facing side of the sidewall portion including the window. The transparent display panel includes a display screen configured to display information to a passenger. The transparent display panel including the display screen have a curved contour that substantially matches the curved contour of the sidewall portion and the window. The sidewall assembly further includes, but is not limited to, a display controller that is in communication with the transparent display panel to communicate a video/audio signal providing the information to the display screen.

In another non-limiting embodiment, the aircraft includes, but is not limited to, a fuselage surrounding an aircraft interior. The fuselage includes a sidewall portion having an inner-facing side disposed adjacent to the aircraft interior. The aircraft further includes, but is not limited to, a window that is disposed in the fuselage at least partially surrounded by the sidewall portion. The sidewall portion and the window have a curved contour. The aircraft further includes, but is not limited to, a transparent display panel that is coupled to the sidewall portion and that covers the inner-facing side of the sidewall portion including the window. The transparent display panel includes a display screen that is configured to display information to a passenger in the aircraft interior. The transparent display panel including the display screen have a curved contour that substantially matches the curved contour of the sidewall portion and the window. The aircraft further includes, but is not limited to, a display controller that is in communication with the transparent display panel to communicate a video/audio signal providing the information to the display screen.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
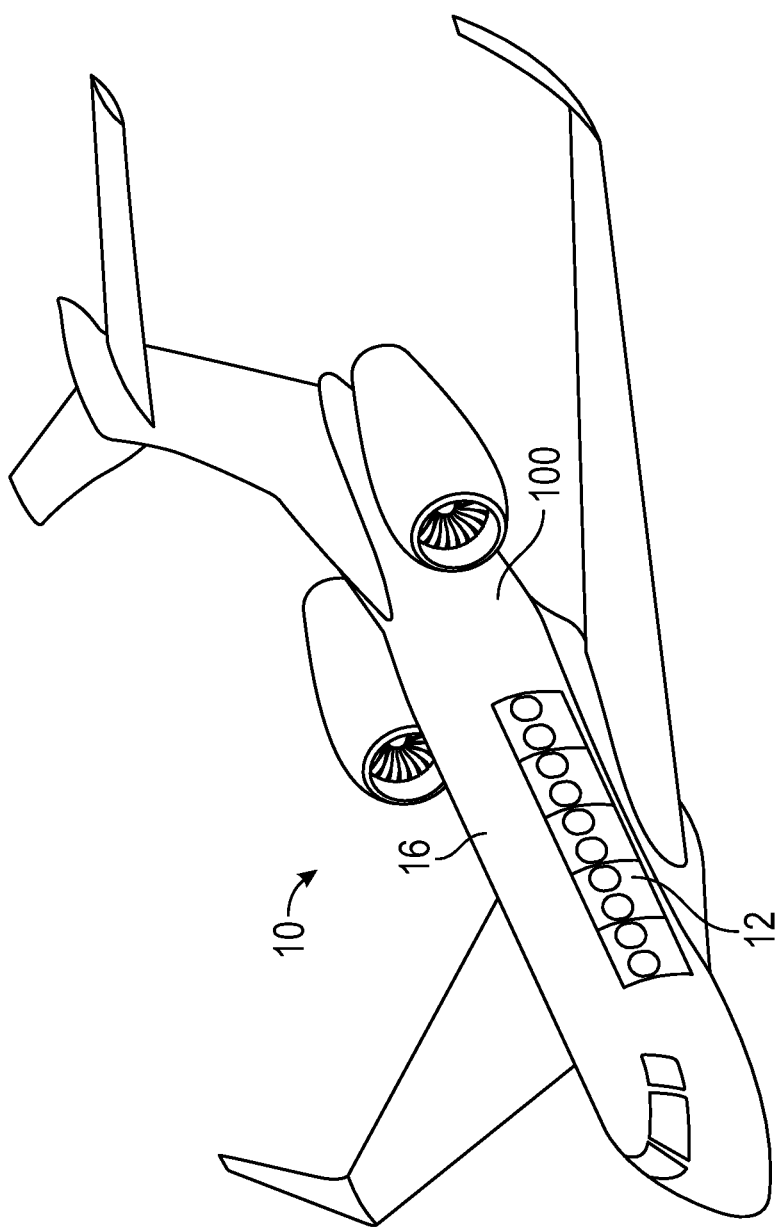
FIG. 1 is a perspective view illustrating an aircraft with a window in accordance with an exemplary embodiment.
Figure 2:
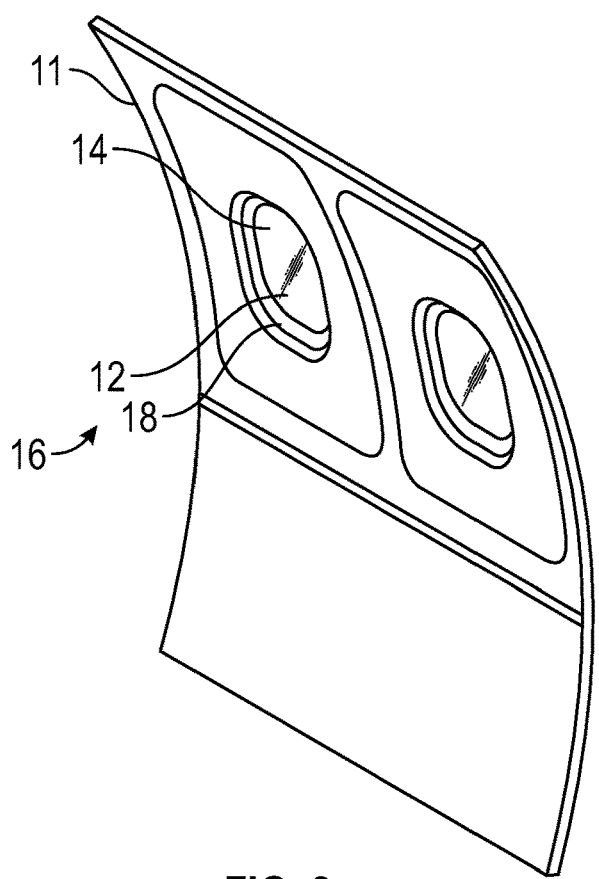
FIG. 2 is a perspective view illustrating an aircraft inner panel including two windows in accordance with an exemplary embodiment.

Example embodiments will now be described more fully with reference to the accompanying drawings. FIGS. 1 and 2 respectively show an aircraft 10 including a fuselage 100 with a window display 12 and an associated inner passenger compartment panel 11 according to the present teachings. The window display 12 is configured to be placed between an outer window member 14 of an aircraft passenger compartment 16 and an inner passenger compartment window 18. The window display 12 is configured to provide textual or graphical information to a passenger within the passenger compartment 16. As described below, the display 12 can be releasably fixed to the inner compartment window 18 for ease of repair or replacement. The inner passenger compartment panel 11 can include switches or capacitive sensors (not shown) which allow for the interface by the passenger with the contents of the display 12.

The display 12 includes a transparent (e.g. translucent) display member 20 (see FIG. 3) for transmitting information to the passenger. This transparent display member 20 can be an thin film transparent display member such as LCD display or a transparent thin film having associated OLEDs. Additionally, the display member 20 can be a projection display associated along the frame of the display member The thin film transparent display 20 has a controllable data transmission circuit 22 for varying the light transmission through or from the pixels 24 defined in the thin film transparent display member 20 (see FIG. 3).

Figure 3:
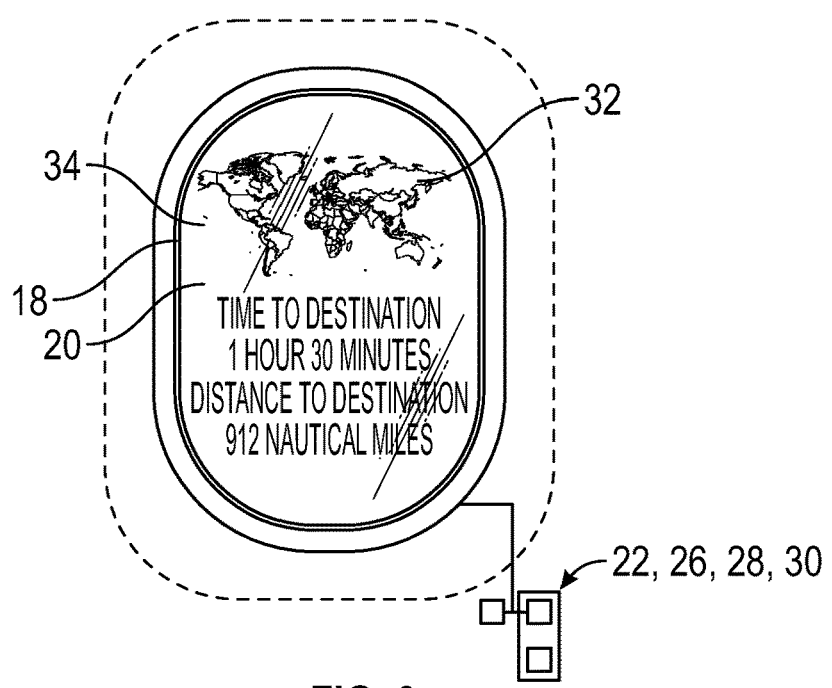
FIG. 3 is a front view of a window in accordance with an exemplary embodiment.

As best seen in FIG. 3, the controllable data transmission circuit 22 has a plurality of associated sensors (26, 28, 30) which can be used to vary the color or amount of light transmitted through each pixel associated with an image 32. Alternatively, changes the amount or color of or amount of light associated with the background 34 of the display member 20 can be automated to maximize visibility. Because of differences in altitude and positioning of the sun about the earth, there will be large variations in the amount of backlight passing through the outer window member 14 at any given time. Because of the changes in environmental conditions, the associated sensor 30 can be a temperature measuring sensor which will allow the circuit 22 to change currents to the display member as is needed to maintain visual quality or to protect the thin film display.

Additionally, as the internal cabin lighting may be changed during a flight, the visibility of information transmitted by the display member 20 for the passenger can be obscured. As such, the circuit 22 can include a pair of light receiving sensors 26, 28 which determine the amount of light passing through the window assembly and the inner passenger compartment. Both sensors 26, 28 provide a signal indicative of these light values. The controllable data transmission circuit 22 then will calculate a difference in the amount of light between the outside and inside of the cabin and adjust either the darkness or color of pixels sending transmitting information, or the amount of light transmitted through a background.

In the case of an OLED display, the amount of light transmitted by the OLEDS can be adjusted to adjust current or voltage to the OLED to change the visibility of pixels transmitting information or the temperature of the thin film display. Additionally, the display member 20 can incorporate capacitive touch sensors which will allow the passenger to interact with the window display 12 to change the image on the display 12. These touch sensors can use the electrodes of the OLEDS to convert the display member into a capacitive touch pad.

Optionally, the thin display member 20 can include a second layer of LCD or polarizable material (not shown) that can change the overall amount of light transmitted through the inner compartment window 18. It is envisioned that the display member 20 can be used to communicate safety information to the passengers such as a need to remain seated or fasten seat belts. Additional, as shown in FIG. 3, information related to the location of the aircraft along a flight path, viewable items in the ground or sky of interest, or movies can be shown.

Figure 4:
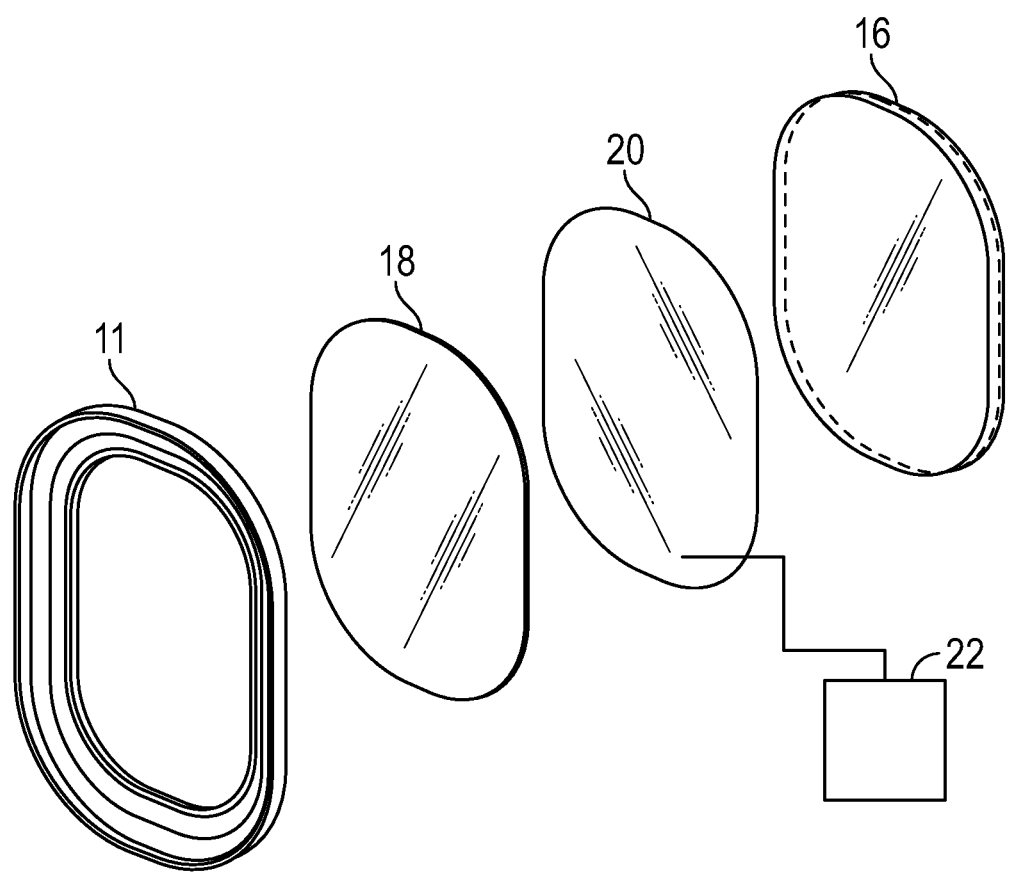
FIG. 4 is an exploded view of the window in accordance with an exemplary embodiment.

FIG. 4 represents an exploded view of the window according to the present teachings. Shown is the associated inner passenger compartment panel 11 which can be of the form of a wall panel or a window frame. As shown, the window display 12 is positioned between an outer window member 14 of an aircraft passenger compartment 16 and an inner passenger compartment window 18. To facilitate repair, the display 12 can be releasably fixed to the inner compartment window 18 for ease of access.

Figure 5:
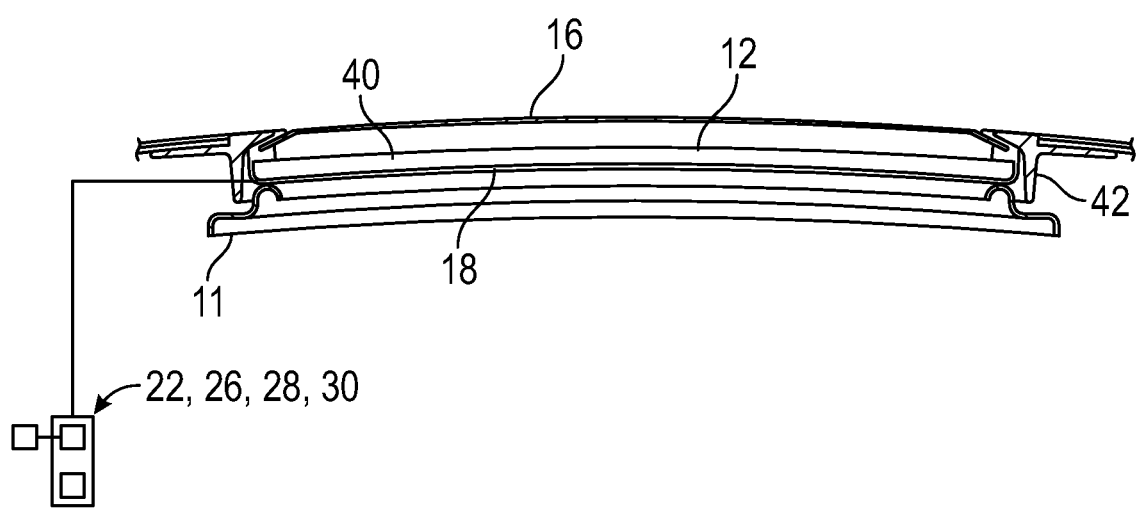
FIG. 5 is a sectional view illustrating a cross section through the window of FIGS. 1-4.
Figure 6:
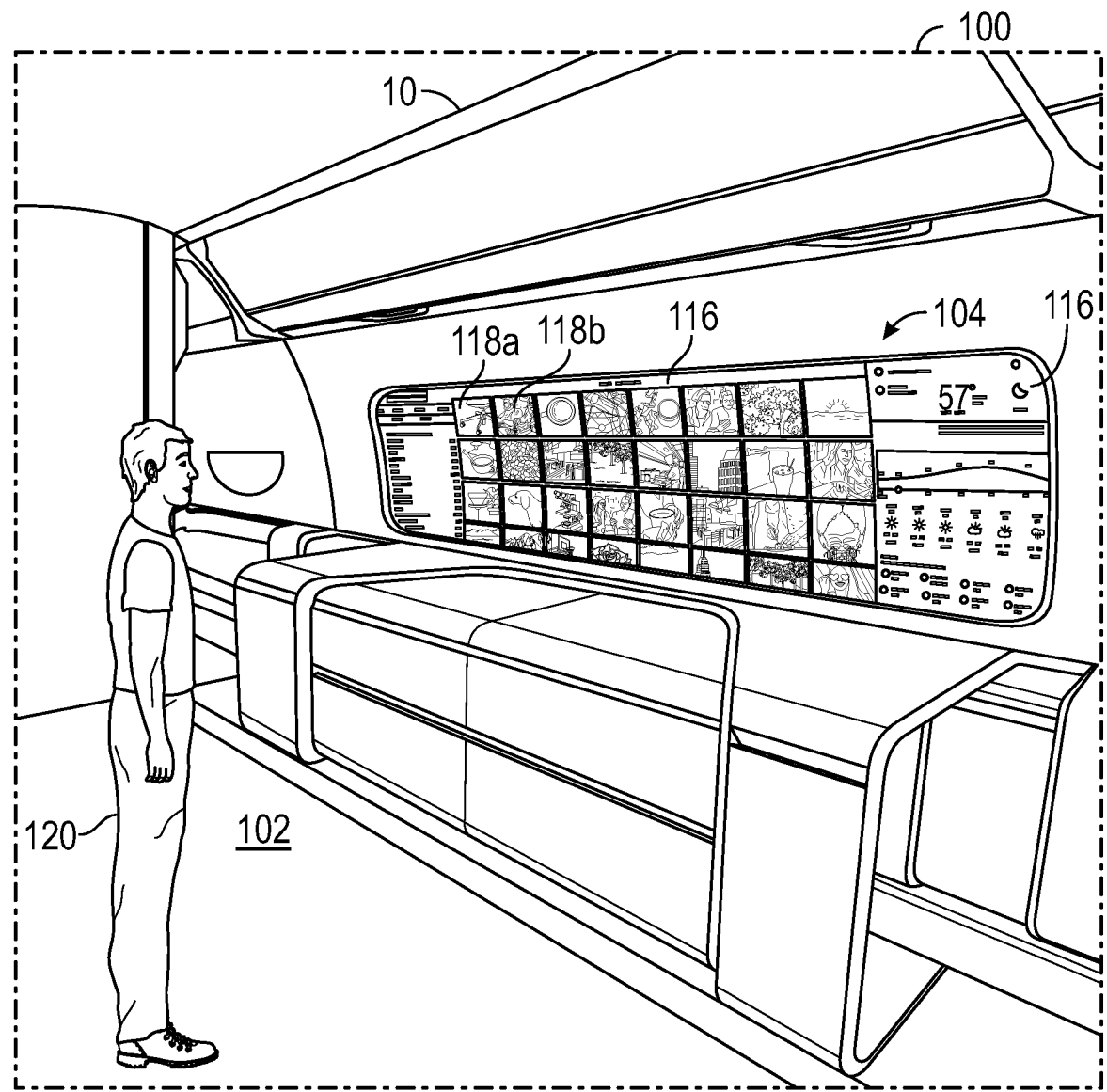
FIG. 6 is a perspective view illustrating an aircraft interior including a sidewall assembly that includes a transparent display panel with a plurality of display screens in accordance with an exemplary embodiment.

FIG. 5 shows a cross section through an aircraft window with the display member 20. The outer window member 14 and an inner passenger compartment window 18 can have a curved or flat configuration (i.e. planar or substantially planar cross-sectional shape). The outer surface 40 of the inner passenger compartment window 18 is spaced from or offset from the outer window member 14 and the defined fuselage contour. Disposed on the outer surface 40 is the display member 20 which is functionally positioned between the inner and outer window members (18, 16). By coupling the display member 20 to the outer surface 40 of the inner passenger compartment window 18, the display member 20 can be protected from passenger contact. This additionally allows for a frame 42 to be used as a support for the display member 20 and an electrical connector (not shown) for data and power transmission.

Examples of suitable materials for the outer 14 and inner window panels 18 can include, but are not limited to, plastic materials (such as acrylic polymers). Such as polyacrylates; polyalkylmethacrylates, such as polymethylmethacrylates, polyethylmethacrylates, polypropylmethacrylates, stretched acrylic, and the like; polyurethanes; polycarbonates; poly-alkylterephthalates, such as polyethyleneterephthalate (PET), polypropyleneterephthalates, polybutylene terephthalates, and the like; polysiloxane-containing polymers; or copolymers of any monomers for preparing these, or any mixtures thereof); glass, such as conventional soda-lime-silicate glass (the glass can be annealed, heat treated, or chemically tempered glass); or combinations of any of the above.

The inner window 18 and outer window 14 are preferably transparent to visible light. By "transparent" is meant having visible light transmission of greater than 0% up to 100%. Alternatively, one or both of the panels 12, 18 can be translucent. The display member or inner or outer window members (14, 18) can include for instance a film which acts a polarizer or light filter which filters out certain incident light frequencies.

FIGS. 6-14 illustrate another embodiment for providing a display for the aircraft 10. Referring to FIGS. 1, 6-9, and 14, as discussed above, the aircraft 10 includes a fuselage 100 that surrounds an aircraft interior 102. Incorporated into the fuselage 100 is a sidewall assembly 104. The sidewall assembly 104 includes a sidewall portion 106 of the fuselage 100 that includes an inner-facing side 108 disposed adjacent to the aircraft interior 102 and an outer-facing side 110 disposed opposite the inner-facing side 108 adjacent to the outside of the aircraft 10.

Referring to FIGS. 6-9 and 14, in an exemplary embodiment, the sidewall assembly 104 includes a plurality of windows 112 and 114 that are spaced apart and that are partially or fully surrounded by the sidewall portion 106. As illustrated, a transparent display panel 116 is coupled to the sidewall portion 106 covering the inner-facing side 108 of the sidewall portion 106 including the windows 112 and 114. In an exemplary embodiment, the transparent display panel 116 includes one or more display screens 118*a-b* that independently display information (e.g., different information) to a passenger(s) 120 in the aircraft interior 102. In an exemplary embodiment, the transparent display panel 116 is a transparent OLED panel and the display screens 118*a-b* are OLED display screens. In an exemplary embodiment, the transparent display panel 116 has a relatively large screen size of about 55 to about 90 inches for advantageous viewing.

Figure 14:
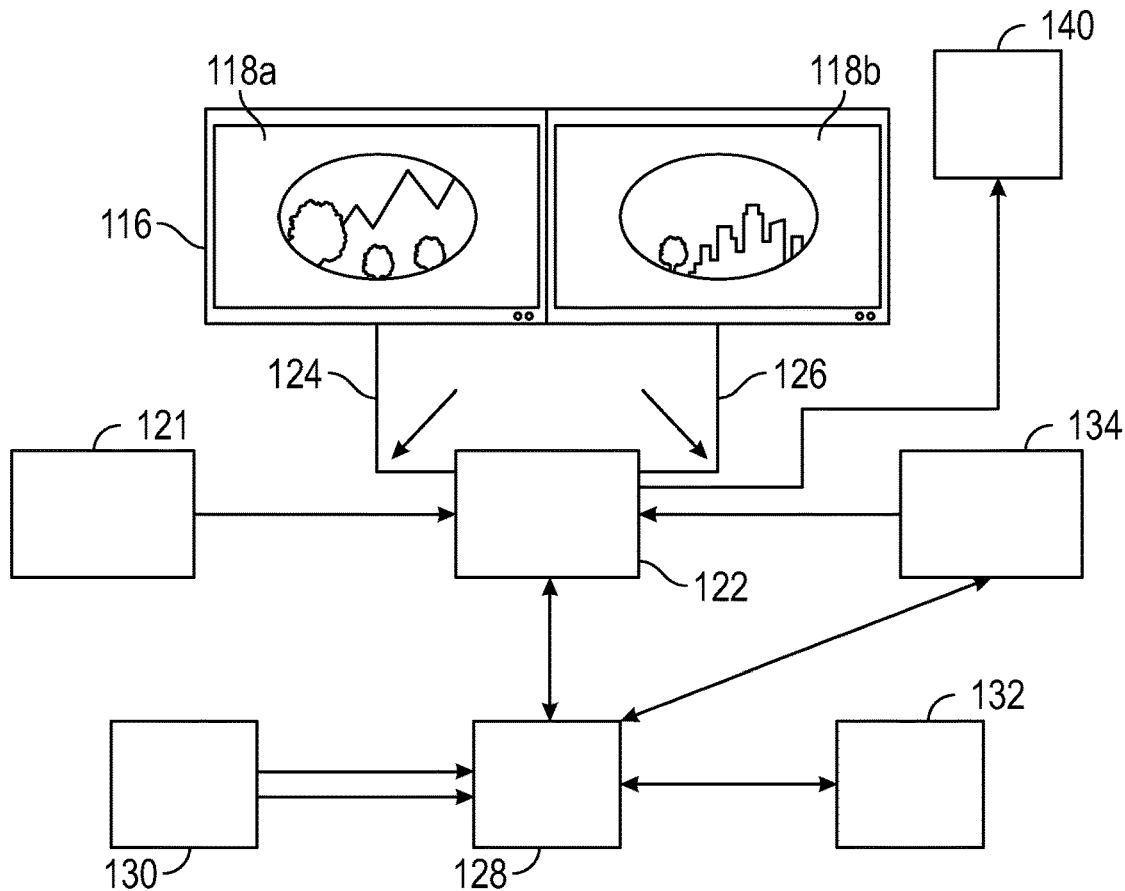
FIG. 14 is a block diagram of a transparent display panel with a plurality of display screens in communication with a display controller and other systems in accordance with an exemplary embodiment.

Referring also to FIG. 14, in an exemplary embodiment, a display controller 122 is in communication with the transparent display panel 116 to communicate video/audio signals 124 and 126 providing corresponding information to the display screens 118*a* and 118*b*. As illustrated, the display controller 122 may be controlled by the passenger 120 or other occupant of the aircraft 10 via a user input device 121 (e.g., hand-held controller, personal computing device or the like) to direct the display controller 122 to communicate the video/audio signals 124 and 126 to the various display screens 118*a* and 118*b*.

In an exemplary embodiment, the display controller 122 is in communication with a cabin management system (CMS) 128. Among various functions, the CMS 128 is configured to control various cabin environmental functions such as temperature, lighting, galley services, and in-flight entertainment which includes audio, video, interfaces to personal electronic devices, access to media content storage (audio & video files), satellite TV, and moving map equipment as well as access to long-range satellite communications and internet connectivity. As illustrated, the CMS 128 is in communication with an avionics system 130, an internet gateway 132, and an audio-video database 134, which contains a plurality of audio-video information and/or a plurality of movies, and provides information to the display controller 122 corresponding to temperature information, safety information, audio/video information, movies, financial market information, internet accessed information, flight information, and/or viewable items outside the aircraft. Independently, the display controller 122 may be in direct communication with the audio-video database 134 to access the audio-video information and/or movies for communication to one or more of the display screens 118*a* and/or 118*b*. In one example, the display controller 122 accesses the audio/video database 134 (e.g. directly or through the CMS 128) to communicate video/audio signals 124 to the transparent display panel 116 for display of a movie (e.g., audio/video information) on the display screen 118*a*, and independently accesses the avionics system 130 (e.g., through the CMS 128) to communicate video/audio signals 126 for display of flight information on the display screen 118*b*.

Figure 7:
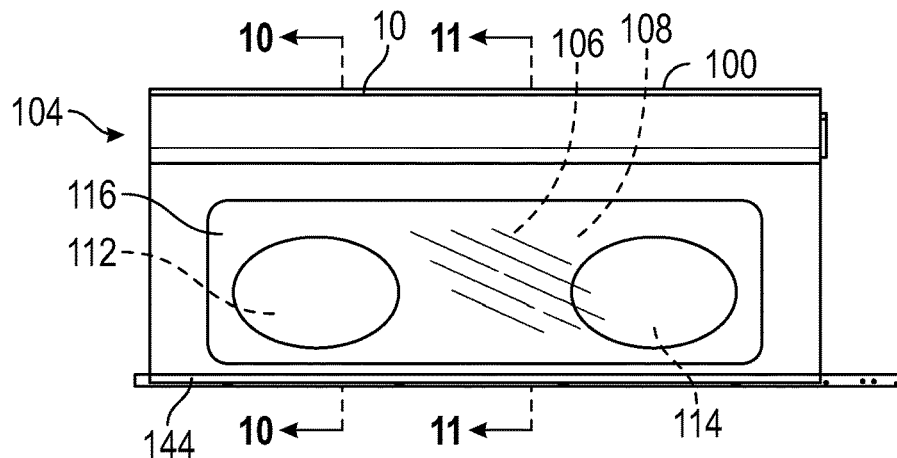
FIG. 7 is a side view of a sidewall assembly for an aircraft in accordance with an exemplary embodiment.
Figure 8:
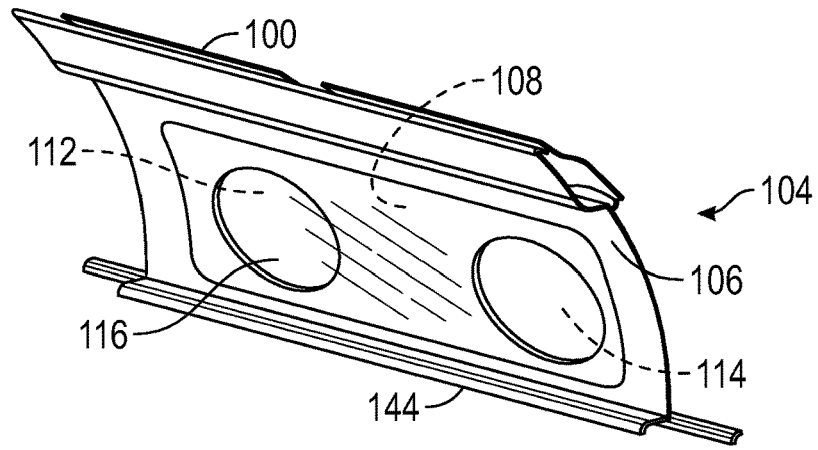
FIG. 8 is a perspective view of a sidewall assembly for an aircraft in accordance with an exemplary embodiment.
Figure 9:
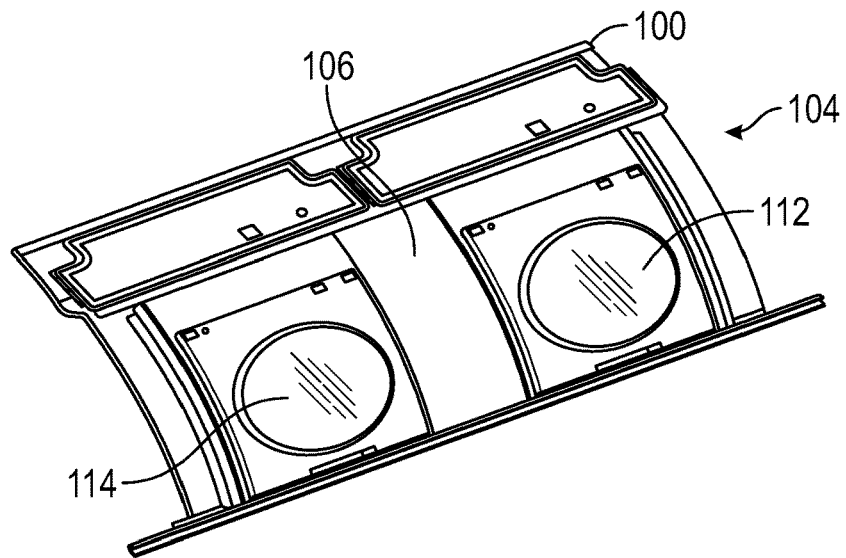
FIG. 9 is a perspective view of a sidewall assembly for an aircraft in accordance with an exemplary embodiment.

In an exemplary embodiment, the user input device 121 is used to switch the transparent display panel 116 on and/or off. In one example and as illustrated FIGS. 6 and 14, the transparent display panel 116 is turned to an "on condition" that enables or otherwise powers the display screens 118*a* and/or 118*b* to display corresponding information as discussed above. In another example and as illustrated in FIGS. 7-8, the transparent display panel 116 is turned to an "off condition" where the transparent display panel 116 is transparent to allow the inner-facing side 108 of the sidewall portion 106 including the windows 112 and 114 to be visible through the transparent display panel 116 to the passenger 120. As such, the passenger 120 can view clearly through the transparent display panel 116 and the windows 112 and 114 to outside the aircraft 10 when the transparent display panel 116 is in the "off condition."

Figures 10, 11:
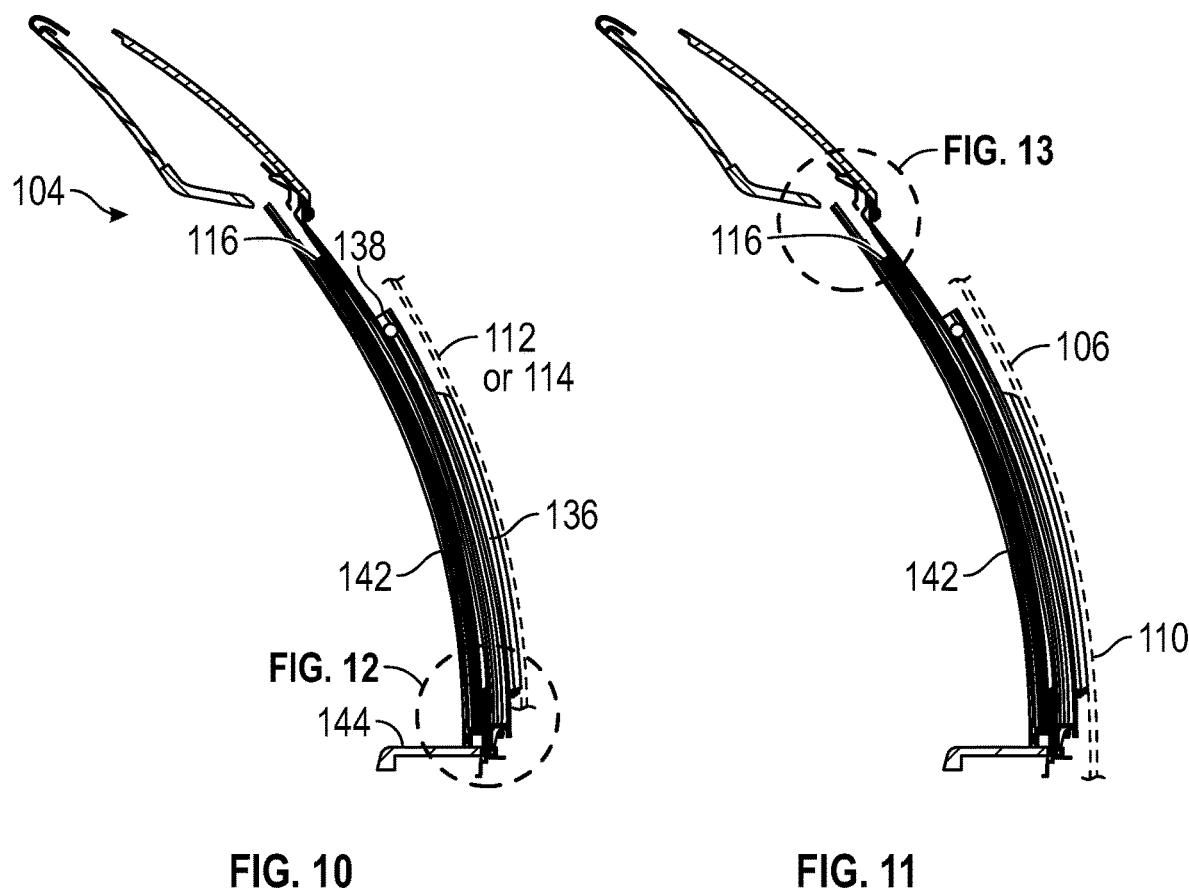
FIG. 10 is a sectional view of the sidewall assembly depicted in FIG. 7 along line 10-10.
FIG. 11 is a sectional view of the sidewall assembly depicted in FIG. 7 along line 11-11.
Figure 12:
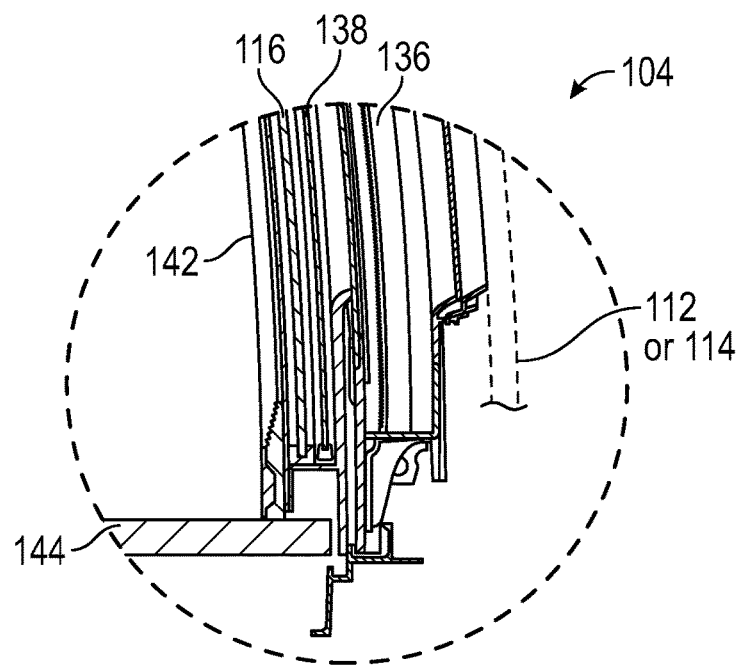
FIG. 12 is an enlarged sectional view of the sidewall assembly depicted in FIG. 10 in the and circled area 12.
Figure 13:
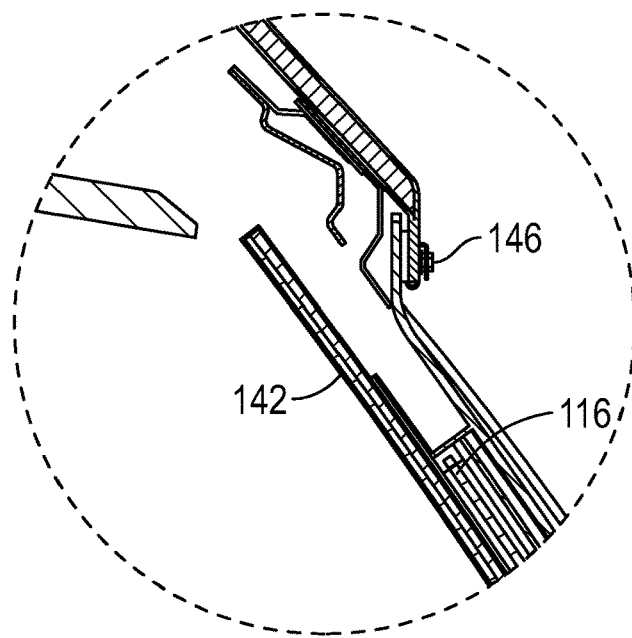
FIG. 13 is an enlarged sectional view of the sidewall assembly depicted in FIG. 11 in the and circled area 13.

Referring to FIGS. 7-14, in an exemplary embodiment, the sidewall assembly 104 includes a window shade 136 for each of the windows 112 and 114. The window shade 136 is disposed between the window 112 or 114 and the transparent display panel 116. Each of the window shades 136 are movable between an open position (as illustrated on FIGS. 7-9) to allow light to pass between the windows 112 and 114 and the transparent display panel 116 when the transparent display panel 116 is in the "off condition" and a closed position (as illustrated in FIGS. 10 and 12) to obstruct light from passing between the windows 112 and 114 and the transparent display panel 116 when the transparent display panel 116 is in the "on condition," for example to enhance viewing of the display screens 118*a-b*.

To further enhance viewing of the display screens 118*a-b*, in an exemplary embodiment, the sidewall assembly 104 includes a movable blackout panel 138 (e.g. black opaque panel) for each of the windows 112 and 114. The movable blackout panel 138 is disposed between the corresponding window shade 136 and the transparent display panel 116. In an exemplary embodiment, the display controller 122 is in communication with a blackout control device 140 that is operable coupled to the movable blackout panels 138 to move the panels 138 between a retracted position (as illustrated on FIGS. 7-9) that allows light to pass between the windows 112 and 114 and the transparent display panel 116 when the transparent display panel 116 is in the "off condition" and an extended position (as illustrated in FIGS. 10 and 12) that obstructs light from passing between the windows 112 and 114 and the transparent display panel 116 when the transparent display panel 116 is in the "on condition." As such, with the movable blackout panels 138 and the window shades 136 in the retracted/open positions, the passenger 120 can see clearly through the transparent display panel 116 and the windows 112 and 114 to outside of the aircraft 10. Likewise, with the movable blackout panels 138 and the window shades 136 in the extended/closed positions, enhance viewing of the display screens 118*a-b* to the passenger 120 is provided because the area behind the transparent display panel 116 is blacked out by obstructing outside light from passing through the windows 112 and 114 into the area behind the display screens 118*a-b*.

In an exemplary embodiment, the blackout control device 140 is further configured to move the window shades 136 between the open position and the closed position. In one example, the display controller 122 communicates command signals to the blackout control device 142 move the window shades 136 independently or together with movable blackout panels 138 between the open/retracted positions and the closed/extended positions.

Referring to FIGS. 7-8 and 10-13, in an exemplary embodiment, the sidewall assembly 104 includes a transparent covering 142 that is disposed adjacent to and covers the transparent display panel 116. For example, the transparent covering 142 is a plastic sheet formed of a transparent or amorphous polymeric material, such as, for example polymethylmethacrylate (PMMA), polycarbonate (e.g., Lexan), or the like.

As illustrated, a ledge 144 is disposed adjacent to the inner-facing side 108 of the sidewall portion 106 extending under the transparent display panel 116 and the transparent covering 142 towards the aircraft interior 102. In an exemplary embodiment, the ledge 144 is both a functional and aesthetical trim piece that provides an understructure for supporting the transparent display panel 116. Additionally, the transparent display panel 116 is secured to the sidewall portion 106 via fasteners 146.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A sidewall assembly for an aircraft, the sidewall assembly comprising:
   a window;
   a sidewall portion having an inner-facing side and at least partially surrounding the window, wherein the sidewall portion and the window have a curved contour;
   a transparent display panel coupled to the sidewall portion and covering the inner-facing side of the sidewall portion including the window, the transparent display panel comprising a display screen configured to display information to a passenger, wherein the transparent display panel including the display screen have a curved contour that substantially matches the curved contour of the sidewall portion and the window;
   a display controller in communication with the transparent display panel to communicate a video/audio signal providing the information to the display screen; and
   a window shade that is disposed between the window and the transparent display panel and that is movable between an open position to allow light to pass between the window and the transparent display panel and a closed position to obstruct light from passing between the window and the transparent display panel.

2. The sidewall assembly of claim 1, wherein the transparent display panel is configured to be switchable between an on condition that enables the display screen to display the information and an off condition where the transparent display panel is transparent to allow the inner-facing side of the sidewall portion including the window to be visible through the transparent display panel to the passenger.

3. The sidewall assembly of claim 1, further comprising at least one additional window, wherein the sidewall portion at least partially surrounds the at least one additional window, and wherein the transparent display panel covers the at least one additional window.

4. The sidewall assembly of claim 1, wherein the transparent display panel comprises at least one additional display screen configured to display additional information to the passenger, and wherein the display controller is in communication with the transparent display panel to communicate at least one additional video/audio signal providing the additional information to the at least one additional display screen.

5. The sidewall assembly of claim 1, further comprising a transparent covering disposed adjacent to and covering the transparent display panel.

6. The sidewall assembly of claim 1, further comprising a ledge disposed adjacent to the inner-facing side of the sidewall portion extending under the transparent display panel.

7. The sidewall assembly of claim 1, wherein the transparent display panel has a screen size of about 55 to about 90 inches.

8. The sidewall assembly of claim 1, further comprising:
   a movable blackout panel that is disposed between the window and the transparent display panel; and a blackout control device that is configured to move the movable blackout panel between a retracted position to allow light to pass between the window and the transparent display panel and an extended position to obstruct light from passing between the window and the transparent display panel.

9. The sidewall assembly of claim 8, wherein the display controller is configured to provide a command signal to the blackout control device to move the movable blackout panel between the retracted position and the extended position.

10. An aircraft comprising:
a fuselage surrounding an aircraft interior and comprising a sidewall portion having an inner-facing side disposed adjacent to the aircraft interior;
a window disposed in the fuselage at least partially surrounded by the sidewall portion, wherein the sidewall portion and the window have a curved contour;
a transparent display panel coupled to the sidewall portion and covering the inner-facing side of the sidewall portion including the window, the transparent display panel comprising a display screen configured to display information to a passenger in the aircraft interior, wherein the transparent display panel including the display screen have a curved contour that substantially matches the curved contour of the sidewall portion and the window;
a display controller in communication with the transparent display panel to communicate a video/audio signal providing the information to the display screen, and
a window shade that is disposed between the window and the transparent display panel and that is movable between an open position that allows light to pass between the window and the transparent display panel when the transparent display panel is in the off condition and a closed position that obstructs light from passing between the window and the transparent display panel when the transparent display panel is in the on condition.

11. The aircraft of claim 10, further comprising a cabin management system (CMS) in communication with the display controller to provide the information to the display controller, wherein the information includes one of temperature information, safety information, audio/video information, a movie, financial market information, internet accessed information, flight information, a viewable item outside the aircraft, and a combination thereof.

12. The aircraft of claim 11, further comprising an audio/video database containing the information corresponding to one of the audio/video information, a plurality of movies, and a combination thereof, and wherein one of the display controller and the CMS are in communication with the audio/video database for receiving the information.

13. The aircraft of claim 10, wherein the transparent display panel is configured to be switchable between an on condition that enables the display screen to display the information and an off condition where the transparent display panel is transparent to allow the inner-facing side of the sidewall portion including the window to be visible through the transparent display panel to the passenger.

14. The aircraft of claim 10, further comprising:
a movable blackout panel that is disposed between the window shade and the transparent display panel; and
a blackout control device that is configured to move the movable blackout panel between a retracted position that allows light to pass between the window and the transparent display panel when the transparent display panel is in the off condition and an extended position that obstructs light from passing between the window and the transparent display panel when the transparent display panel is in the on condition.

15. The aircraft of claim 14, wherein the blackout control device is further configured to move the window shade between the open position and the closed position.

16. The aircraft of claim 15, wherein the display controller is configured to provide a command signal to the blackout control device to move at least one of the movable blackout panel and the window shade.

17. The aircraft of claim 10, wherein the sidewall portion at least partially surrounds at least one additional window, and wherein the transparent display panel covers the at least one additional window.

18. The aircraft of claim 10, further comprising:
a transparent covering disposed adjacent to and covering the transparent display panel; and
a ledge disposed adjacent to the inner-facing side of the sidewall portion extending under the transparent display panel and the transparent covering.

* * * * *